US00RE47066E

(19) United States
(12) Reissued Patent
Carlson et al.

(10) Patent Number: US RE47,066 E
(45) Date of Reissued Patent: Oct. 2, 2018

(54) CREMATED REMAINS REMEMBRANCE AND BURIAL SYSTEM

(71) Applicants: Charles Carlson, Woodbury, MN (US); Donald Eyberg, Minneapolis, MN (US); Mark Cannon, Mora, MN (US)

(72) Inventors: Charles Carlson, Woodbury, MN (US); Donald Eyberg, Minneapolis, MN (US); Mark Cannon, Mora, MN (US)

(21) Appl. No.: 15/424,083

(22) Filed: Feb. 3, 2017

Related U.S. Patent Documents

Reissue of:
(64) Patent No.: 8,943,762
Issued: Feb. 3, 2015
Appl. No.: 14/149,133
Filed: Jan. 7, 2014

U.S. Applications:
(60) Provisional application No. 61/749,792, filed on Jan. 7, 2013.

(51) Int. Cl.
*A61G 17/08* (2006.01)
*E04H 13/00* (2006.01)

(52) U.S. Cl.
CPC ..... *E04H 13/008* (2013.01); *A61G 17/08* (2013.01)

(58) Field of Classification Search
CPC ..... E04H 13/008; A61G 17/08
USPC .... 52/137, 136, 128, 140; 27/35, 27, DIG. 1
See application file for complete search history.

(56) References Cited

U.S. PATENT DOCUMENTS 2,009,724 A 7/1935 Bircher
2,562,726 A 7/1951 MacDonald et al.
3,726,052 A * 4/1973 Thompson ..... 52/103
3,898,718 A * 8/1975 Eubank ..... 27/35
4,328,606 A 5/1982 Nunes
4,521,999 A 6/1985 Flanagan
5,029,373 A 7/1991 Raymond
5,740,637 A * 4/1998 Snow ..... 52/136
5,832,575 A 11/1998 Sturino
6,023,822 A * 2/2000 Luebke ..... A61G 17/08 27/1
6,167,600 B1 1/2001 Williams et al.
6,279,212 B1 * 8/2001 Balch ..... 27/1
6,463,703 B1 * 10/2002 Mattis ..... E04H 13/003 52/103
6,875,522 B2 * 4/2005 Seto et al. ..... 428/611
6,904,721 B1 * 6/2005 Forbes ..... 52/103
6,944,921 B1 9/2005 Gersten
7,036,195 B2 * 5/2006 Glass ..... 27/1
7,178,209 B1 * 2/2007 Radziewicz ..... 27/1
(Continued)

*Primary Examiner* — Beverly M Flanagan
(74) *Attorney, Agent, or Firm* — Michael A. Bondi; Moss & Barnett

(57) ABSTRACT

A cremated remains remembrance and burial system that includes an urn, an urn lid, an urn enclosure and a headstone. The urn includes an enclosure with an opening, a first sealing mechanism and second sealing mechanism. The urn lid is capable of engaging the first sealing mechanism to substantially seal the enclosure. The urn enclosure has a recess formed therein that is adapted to receive the urn. The urn enclosure is adapted to engage the second sealing mechanism to retain the urn in engagement with the urn enclosure. The headstone has an opening formed therein that is adapted to receive at least a portion of the urn. The headstone is adapted to engage the second sealing mechanism to retain the urn in engagement with the headstone.

24 Claims, 10 Drawing Sheets

(56) References Cited

U.S. PATENT DOCUMENTS

| | | | | |
|---|---|---|---|---|
| 7,272,874 | B2 | 9/2007 | Staab | |
| 7,406,754 | B2 * | 8/2008 | Trail | 27/1 |
| 7,478,461 | B2 * | 1/2009 | Glass | 27/1 |
| 7,703,185 | B2 * | 4/2010 | Trail | E04H 13/003 27/1 |
| D622,023 | S | 8/2010 | Molitor et al. | |
| 7,987,564 | B2 | 8/2011 | Leeder | |
| 8,214,979 | B2 | 7/2012 | Scruggs | |
| 8,286,314 | B1 * | 10/2012 | Muthusami | A61G 17/00 27/1 |
| 8,490,258 | B1 * | 7/2013 | Muthusami | A61G 17/00 27/1 |
| 2011/0047893 | A1 * | 3/2011 | Iezza | 52/103 |

* cited by examiner

CREMATED REMAINS REMEMBRANCE AND BURIAL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATION

This application claims priority to U.S. Provisional Application No. 61/749,792, which was filed on Jan. 7, 2013, the contents of each of which are incorporated herein by reference.

FIELD OF THE INVENTION

This field of this invention relates generally to funeral products for the interment of cremated remains receptacles and, more particularly, to a single and multiply cinerary urns containing the cremated remains/ashes of one person and a burial container as a repository system for single or multiple cinerary urns. The burial system contains the individual cremated human or pet remains.

BACKGROUND OF THE INVENTION

Many different frame constructions, depositories, memorial holders and columbarium storage systems have been devised for the interment of human cremated remains for memorialization purposes. Memorial urns have been designed for storing the cremated remains in a repository structure, such as a columbarium or within an individual's residence. Alternatively, ashes are placed in a garden at a crematoria, cemetery, or spread at sea or on land at a particular location. In such an instance, a burial urn is not necessary. Placing ashes in a garden at a crematorium or cemetery does not allow the ashes to be contained in any type of receptacle. This method does not provide a way to preserve the integrity of the ashes.

However, there has always been a demand for unique or different ways of memorializing a deceased person. To my knowledge, none of these moralizing structures have involved the ability to arrange cinerary urns of individuals, couples or family members in a multi-urn burial container. A burial container is a container that houses the cinerary urns. The burial container maybe eliminated if a burial vault structure is required, which intern will house the cinerary urns.

In the funeral industry cremation has become an accepted option for the interment of human remains. Currently, it is the custom that human remains may be stored in an urn, placed in a columbarium, scattered at a designated location or buried under customary policies or applicable statutes.

In recent years many religions, including various Christian faiths have changed their position on cremation from historically discouragement to acceptance due to the growing reality of cost and space considerations for traditional cemetery burials.

While the church has modified its position and has allowed Christians to select cremation as an option, many still choose the burial of cremated remains as a means of complying with traditional Christian preferences.

Currently, some of the challenges incurred with the burial of cremated human remains are: First, it is very expensive since a burial plot must be purchased. Secondly, one does not generally have total control of the deceased's remains or the preferred burial site location or arrangement. Thirdly, one cannot with certainty, provide interment with a spouse, partner, children, parent or other loved one (cherished person). Finally, one cannot generally relocate the deceased's remains, at a future date, if so desired.

SUMMARY OF THE INVENTION

An embodiment of the invention relates to a grave marker, with single or multiple apertures, cremated remains urns and container(s) for cremated remains urns. It may also incorporate a burial vault structure where desired or required by local laws, or cemetery rules and/or regulations. The invention enables the cremated remains to be interred conveniently and efficiently.

Another embodiment of the invention is directed to a cremated remains remembrance and burial system that includes an urn, an urn lid, an urn enclosure and a headstone.

The urn includes an enclosure with an opening, a first sealing mechanism and second sealing mechanism. The urn lid is capable of engaging the first sealing mechanism to substantially seal the enclosure.

The urn enclosure has a recess formed therein that is adapted to receive the urn. The urn enclosure is adapted to engage the second sealing mechanism to retain the urn in engagement with the urn enclosure.

The headstone has an opening formed therein that is adapted to receive at least a portion of the urn. The headstone is adapted to engage the second sealing mechanism to retain the urn in engagement with the headstone.

Another embodiment is directed to a cremated remains remembrance and burial method. Cremated remains are placed in an urn having an enclosure that includes an opening, a first sealing mechanism and a second sealing mechanism.

An urn lid is attached to the urn. The urn lid engages the first sealing mechanism to substantially seal the enclosure. The urn is placed in an urn enclosure. The urn enclosure has a recess formed therein that is adapted to receive the urn. The urn is retained in engagement with the urn enclosure by engaging the urn enclosure with the second sealing mechanism. A memorial service is conducted where persons view the urn enclosure. The urn is separated from the urn enclosure after the memorial service is completed.

The urn is placed in an opening formed in a headstone. The opening is adapted to receive at least a portion of the urn. The urn is retained in engagement with the headstone by engaging the headstone with the second sealing mechanism.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts on the various drawings.

DETAILED DESCRIPTION OF THE PREFERRED EMBODIMENTS

An embodiment of the invention is directed to a cremated remains remembrance and burial system. This invention has been created to address these impediments by providing a burial system for the interment of the cremated human remains that allows for couples, families, relatives, or significant others to have their cinerary urns or ash capsule to be placed adjacent to each other in a burial container.

This invention is time flexible in that the cremated remains in a cinerary urn or ash capsule can be inserted at any time and additional family member's cremated remain in a cinerary urn or ash capsules can be included at a future date. A cinerary urn will incorporate the ash capsule from this point on.

In addition, the invention is cost efficient in that there are no significant expenses associated with the burial after the initial purchase and interment of the original cremated remains in the burial container. This arrangement assures a defined future site location for a spouse or additional family members or significant others.

The cemetery burial plot location can be significantly smaller without the requirement to accommodate traditional casket and vault arrangement. Alternatively, a cemetery burial plot that is sized for use in conjunction with a conventional casket can instead be used with burying a large number of cremated remains using the concepts of the invention. In such situations, multiple headstones may be used to identify each of the cremated remains buried therein.

As an alternative to using the cremated remains burial system for burying cremated remains in a conventional cemetery, it is possible to use the concepts for burying the cremated remains in other locations where such alternative burial locations is not prohibited by law or regulation. An example of one such alternative burial location is on private property or public lands. Such alternative burial locations may be used in conjunction with memorializing an aspect of the deceased person's life.

Additionally, this invention provides a burial system for the interment of cremated human remains that is completely portable to permit convenient relocation of the cinerary urn or ash capsule and the burial container, if desired or required, at some future date.

This burial system can provide a cinerary urn receptacle to contain the ashes of pets or other animals whose remains are desired to be preserved for sentimental reasons. To our knowledge, at present, no eminently suitable system exists.

Figure 1:
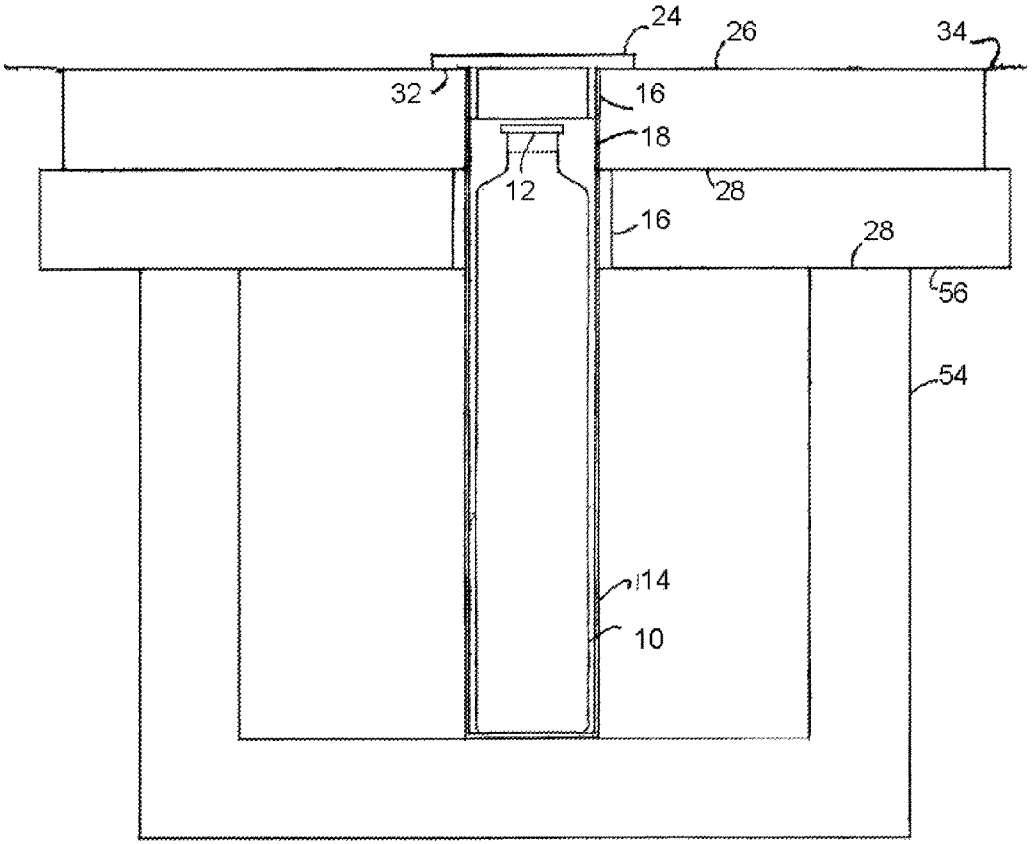
FIG. 1 is a section view of a single cinerary urn interred in the single burial capsule illustrated with permanent top closure cover.

FIG. 1 depicts a cinerary urn 10 having a top lid 12 housed in the burial container 14, or as an option contained in a burial vault 54, if required. The cinerary urn 10 is depicted as a cylindrical (bottle shaped) container; however the size, shape and form of both the cinerary urn, the burial container, and if required burial vault, are variable.

The burial container 14 resides inside the aperture 16 in the headstone 26 and, if required, the foundation pad and burial vault cover 56. The burial container 14 is adhesively or mechanically fastened 18 to permanently bond to the headstone 26. The top closure cover 24 is bonded with adhesive 18 to the headstone 26 to permanently seal off the aperture.

The headstone 26 is leveled and attached to the vault cover 56 with an industrial grade commercially available water-tight leveling compound 28. The burial vault cover 56 is attached to the burial vault 54 with leveling compound 28. Surround grade 34 (ground) is envisioned to be at or near the top surface of the headstone 26.

Figure 2:
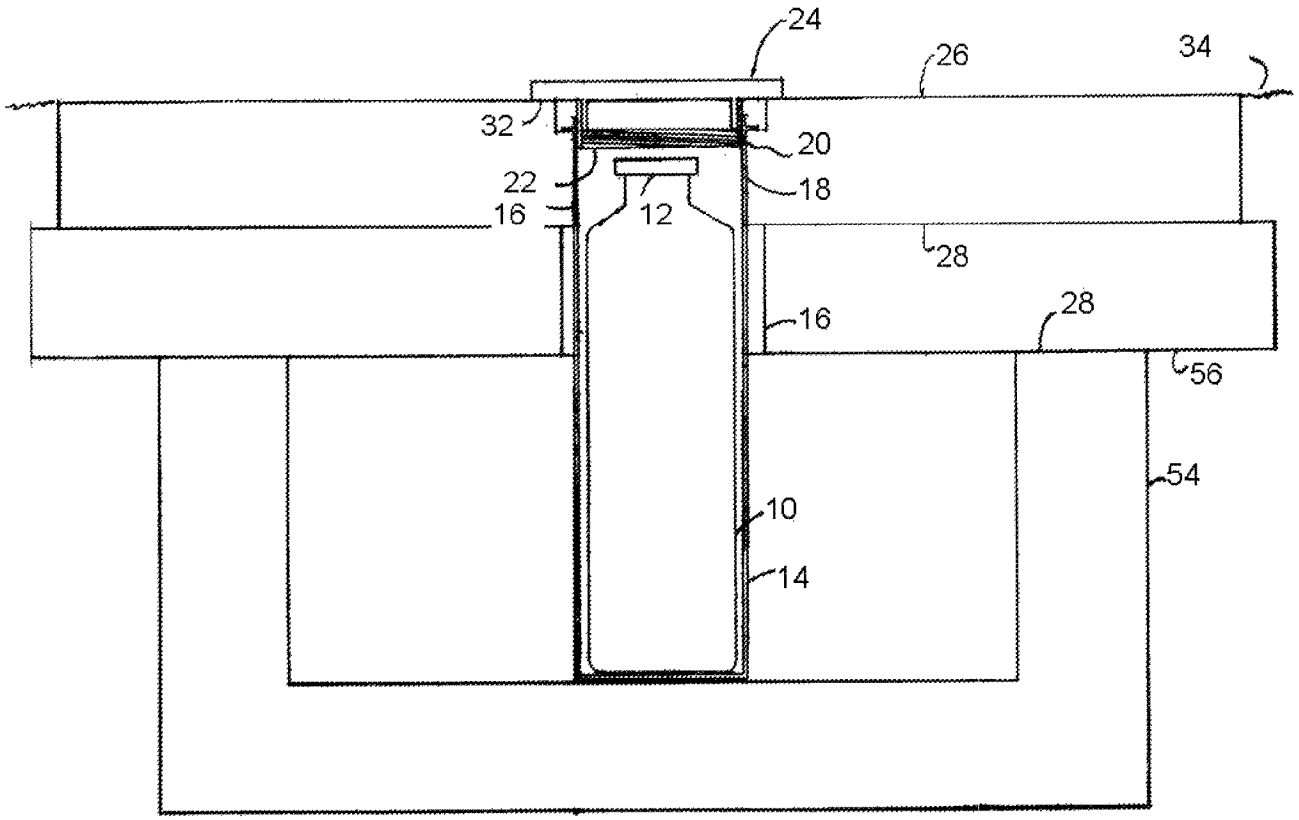
FIG. 2 is a section view of a single cinerary urn interred in the single burial capsule illustrated with reclosable threaded top closure cover.
Figure 3:
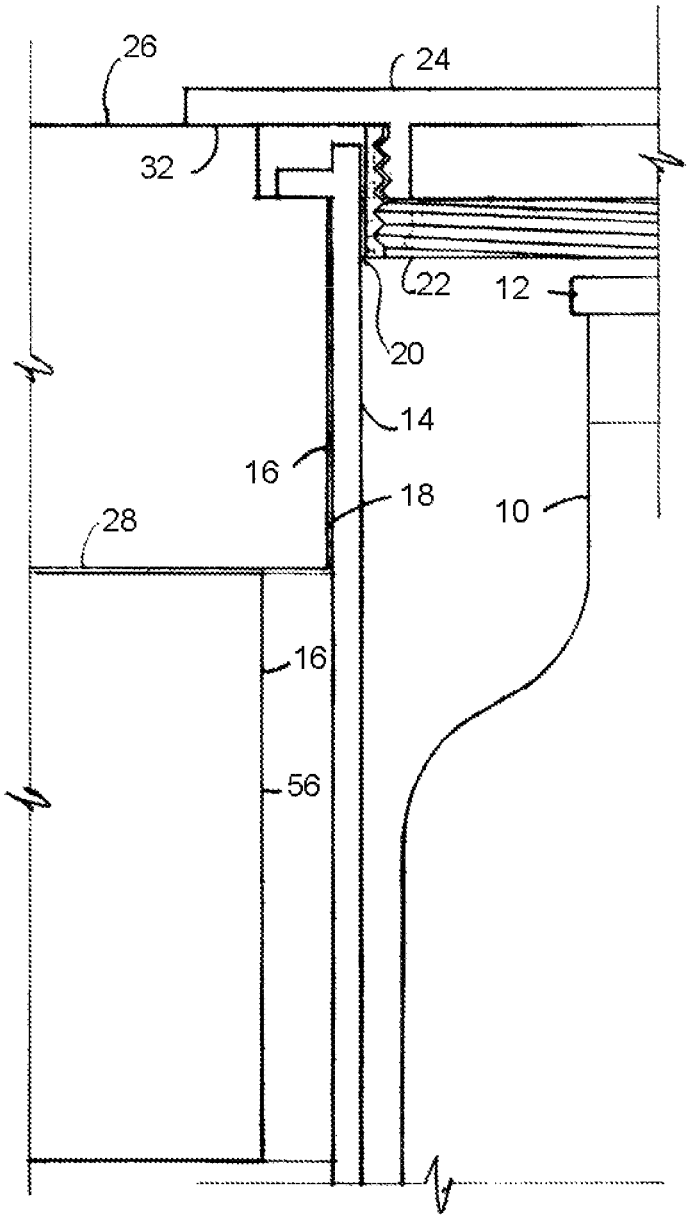
FIG. 3 provides a partial detail of the single or multiple burial capsules illustrating the assembly schematic to assemble the reclosable threaded top closure cover.

FIGS. 2 and 3 illustrate an alternate burial container top closure cover. This section drawing depicts a cinerary urn 10 having a top lid 12 housed in the burial container 14. The cinerary urn 10 is depicted as a cylindrical (bottle shape) container; however the size, shape, and form of the cinerary urn, burial container, and burial vault are variable.

The burial container 14 resides inside and below the aperture 16 in the headstone 26 and the foundation pad or burial vault cover 56. The burial container 14 is adhesively fastened with a water-proof adhesive 18 to bond to the headstone 26.

The cinerary urn 10 and the top lid 12 may be fabricated from a variety of materials using the concepts of the invention. The materials used to fabricate the cinerary urn 10 and the top lid 12 should resist corrosion, degradation and be substantially gas impermeable for an extended period of time.

As used herein, extended period of time means not experiencing corrosion, degradation or becoming gas permeable for more than one year. In other embodiments, the cinerary urn 10 and the top lid 12 resist corrosion, degradation and becoming gas permeable for more than about 10 years.

Examples of materials that exhibit these characteristics include concrete, metals, engineered plastics, fiberglass, carbon fiber, ceramics, stone, manufactured stone, or any other material from which buried containers are being constructed (or maybe developed and constructed). In certain situations, it is also possible to use relatively brittle materials such as glass and ceramic to fabricate the cinerary urn 10 and/or the top lid 12.

Text and/or images may be placed on at least one surface of the cinerary urn 10. Such text and/or images may be used to identify the person whose cremated remains are placed in the cinerary urn. Alternatively or additionally, the text and/or image may be used to identify aspects of the person's life such as the date on which the person was born, the date on which the person died, relatives of the deceased person, the profession of the deceased person and hobbies of the deceased person.

In certain embodiments, a threaded insert 22 is fastened with an adhesive 20 to the inside of burial container 14. The threaded insert 22 may have a generally cylindrical configuration. The threaded insert may be fabricated from a variety of materials. One suitable type of material that may be used is non-ferrous material that resists degradation such as by oxidation or rusting.

The burial container 14 with the threaded insert 22 may be closed off with a flexible gasket or water-proof sealing compound 32, with threaded top closure cover 24. The threaded top closure cover 24 would be secured to the threaded insert 22 to provide a weather tight and security/tamperproof top closure cover to the burial container 14.

Figure 4:
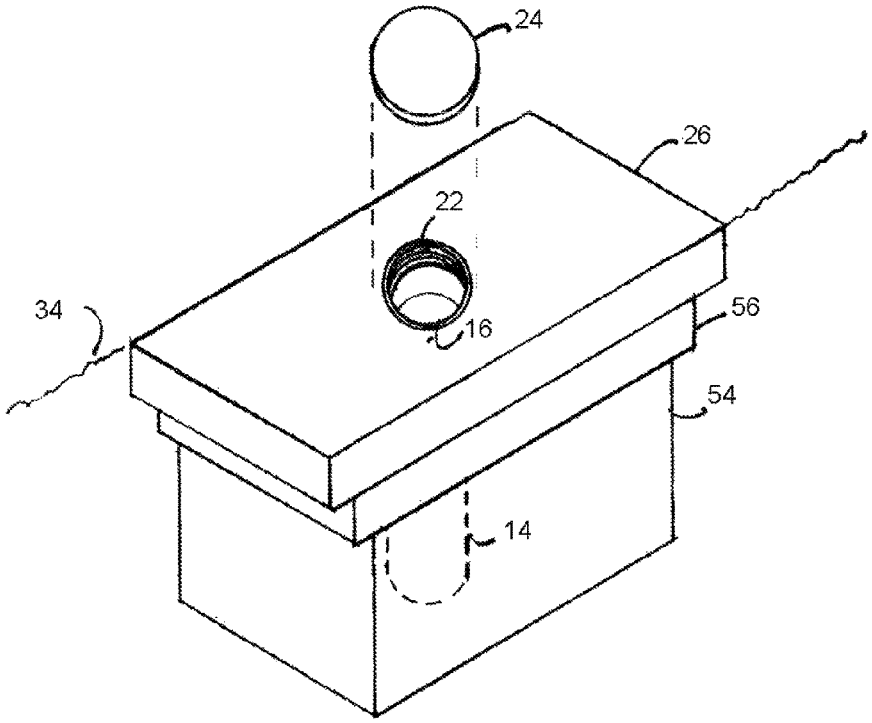
FIG. 4 is a partial isometric view of the burial arrangement for a single cinerary urn.

FIG. 4 is an isometric view of the headstone 26 illustrating the top closure cover 24 that is screwed into the threaded insert 22 that is adhesively fixed into the burial container 14 all within the aperture opening 16 in the headstone 26. The headstone rests on top of the burial vault cover 56 and the burial vault 54.

The top of the headstone is approximately at the elevation of the surround ground 34. For clarity, cinerary urn 10 is not shown in this drawing. FIGS. 2 and 3 headstones would be similar to FIG. 4 with various sizes of burial containers or burial vaults located below the headstone 26 or the burial vault cover 56.

The burial container 14 may be modified to include only the top closure portion if the burial vault 54 and the vault cover 56 are installed and this arrangement is acceptable to the cemetery or burial site possessor.

Figure 5:
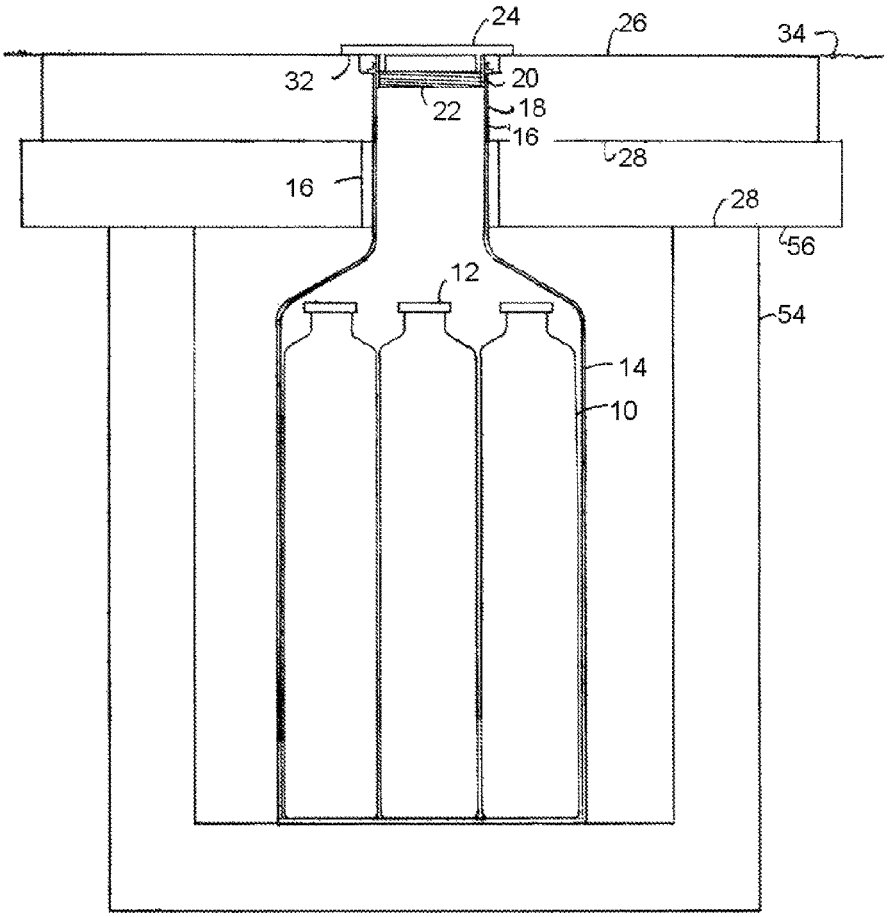
FIG. 5 is a section view of multiple cinerary urns interred in the single burial capsule of sufficient size to accommodate the requisite number of cinerary urns now and in the future.

FIG. 5 illustrates a multiple cinerary urn burial container with a removable top closure cover 24 to facilitate the interment of cinerary urns at various times. This section drawing depicts a cinerary urn 10 having a top lid 12 housed in the burial container 14 or burial vault 54.

Cinerary urn 10 is depicted as a cylindrical (bottle shape) container. However, the size, shape, and form of the cinerary urn, burial container, and burial vault are variable. The burial container 14 resides inside the aperture 16 in the headstone 26 and the vault cover 54 and the burial vault 56. The headstone 26 is leveled and attached to the vault cover 54 with an industrial grade commercially available water-tight leveling compound 28 which is attached to the burial vault 56 with the leveling compound 28.

The burial container 14 is adhesively or mechanically fastened 18 to bond to the headstone 26. The threaded insert 22 is fastened with an adhesive 20 to the inside of burial container 14. The burial container 14 with the threaded insert 22 is closed off with threaded top closure cover 24. The threaded top closure cover 24 would be secured to the threaded insert 22 to provide a weather tight and security/tamperproof top closure cover to the burial container 14.

Figure 6:
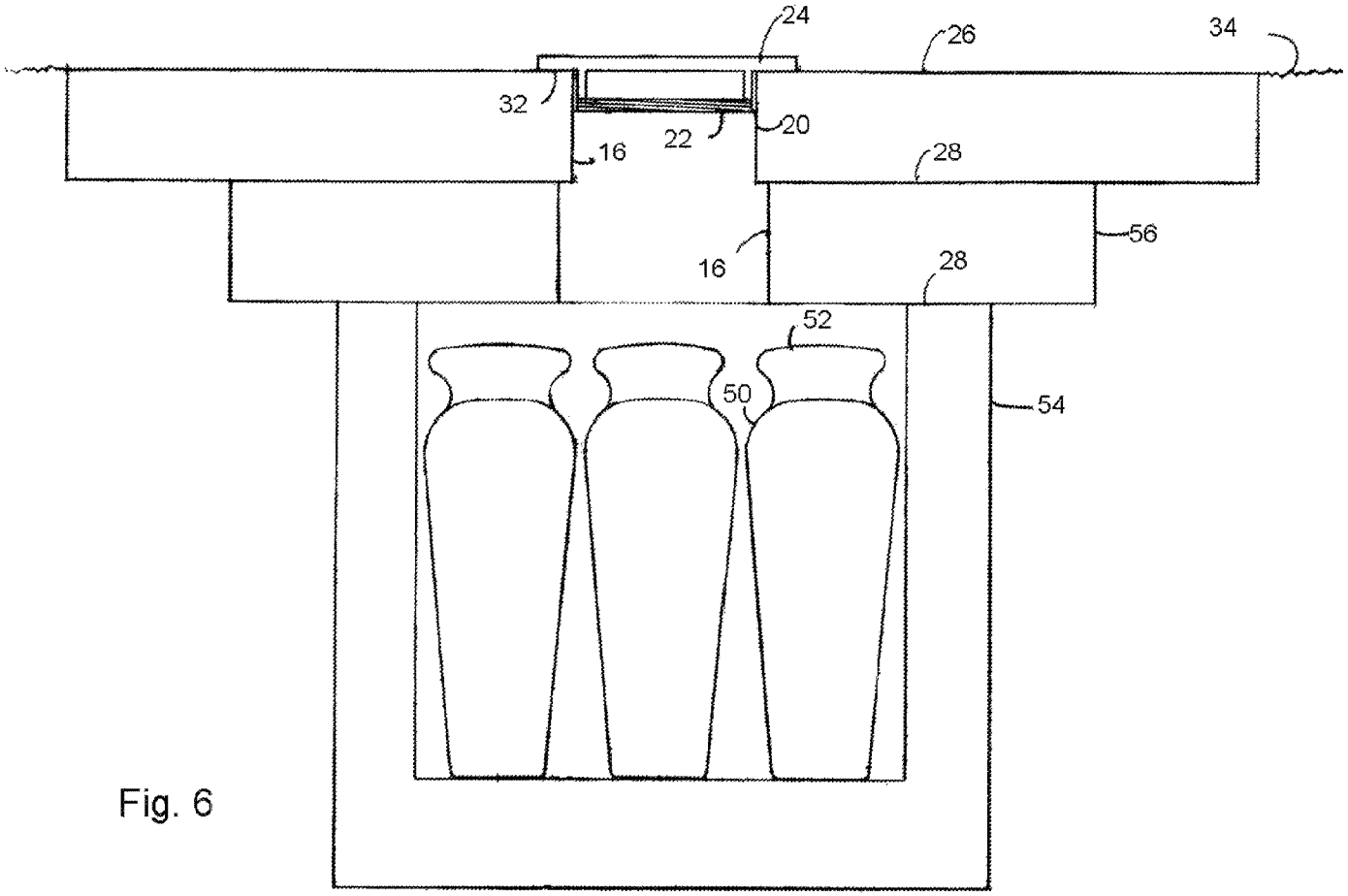
FIG. 6 is a section view of cinerary urns interred in the single concrete burial vault of sufficient size to accommodate a single or multiple cinerary urns.
Figure 7:
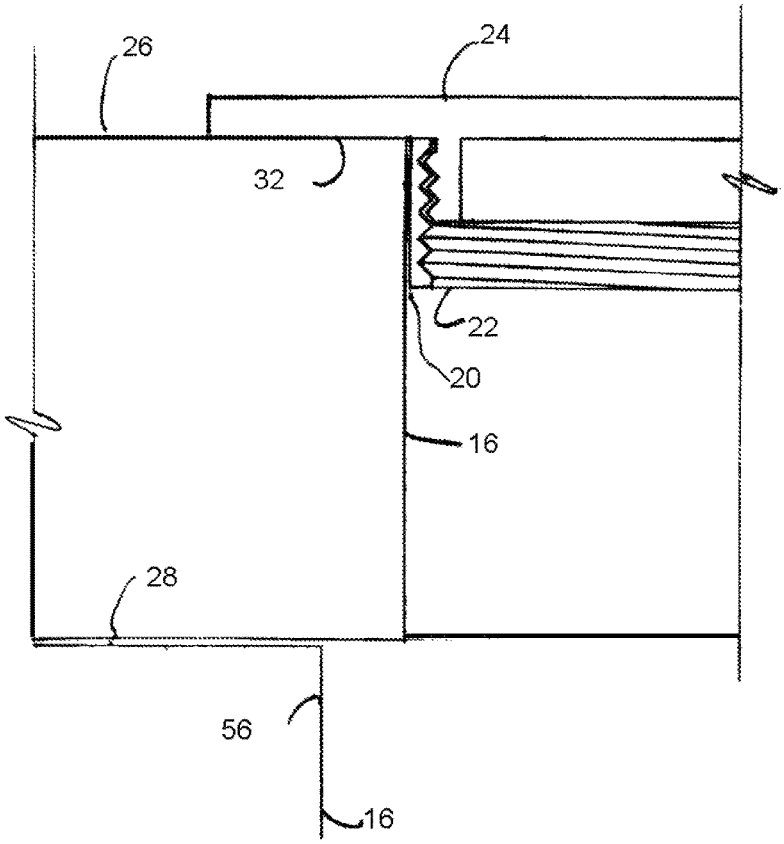
FIG. 7 provides a partial detail of the reclosable threaded top closure cover for the vault burial capsule of FIG. 6.

FIGS. 6 and 7 are section drawings illustrating a burial vault construction containing multiple cinerary urns. This section drawing depicts a cinerary urn 50 having a top lid 52 housed in the burial vault 54. The cinerary urn 50 is depicted as a cylindrical vase shaped container. However the size, shape, and form of the cinerary urn, burial container, and burial vault are variable. The burial vault structure 54 with the vault cover 56 resides below the headstone 26.

An aperture 16 in the headstone 26 and the burial vault cover 56 provides for access to the burial vault through the headstone opening 16. The threaded insert 22 is fastened such as with an adhesive 20 to the inside of headstone 26. The headstone 26 with threaded insert 22 is closed off with threaded top closure cover 24.

The threaded top closure cover 24 would be secured to the threaded insert 22 to provide a weather tight and security/tamperproof top closure cover 24 to the headstone 26 and the burial vault 54.

The headstone 26 is leveled and attached to the burial vault cover 56 with such as with an industrial grade commercially available water tight leveling compound 28. The threaded top closure cover 24 is sealed with a flexible gasket or weatherproof sealing compound material 32 to the headstone 26. This configuration provides a weather tight security closure for the burial vault and cinerary urns while allowing for the additional interment of cinerary urns at future dates.

The size of the burial capsule is sufficiently large to receive the predetermined number of urns which are generally cylindrical in shape and sized to contain approximately 50-300 cubic inches of ash. The urn would have a tight closing top lid to protect and contain the ash contents of the urn. Ideally, the urn-like containers should be water tight and air tight to preserve the remains in a dignified, memorialized environment.

The cinerary urn would be placed in a vertical manner and remain generally upright. It is also possible to adapt the concepts of the invention to bury the cinerary urn in other orientations such as horizontal.

The burial container would have a top aperture or opening to receive the urn(s) and would be fastened to a support plate which is a flat headstone, gravestone, or memorial plaque recessed into the earth to generally be at the level of the surrounding earth to accommodate cemetery lawn or ground maintenance. Alternately, the burial container could be placed above the surrounding earth, if so desired.

The headstone/support plate would be fabricated from materials such as stone, manufactured stone, concrete, metal, engineering grade plastics, or a combination of materials capable of resisting deterioration over an appreciable period of time for the intended use. The headstone/support plate would be capable of bearing an inscription identifying the deceased individual, pet or animal at the discretion of the owner or survivor.

The headstone/support plate functions primarily to locate the burial system on the ground surface and to provide adequate support for the burial container assembly that is fastened and suspended directly underneath it in a buried condition or alternatively housed in the burial vault. The headstone/support plate may be constructed in any geometric shape such as rectangular, circular, oval or other free form shape with sufficient surface area to support the weight of the burial container system.

The burial container would be mechanically or adhesively attached to the headstone flat support plate. The aperture or opening in the headstone flat support plate would contain a threaded insert adhesively attached to the flat support plate.

This insert would receive a threaded connector that provides a weather tight and security/tamperproof top closure cover to the burial container.

Figure 9:
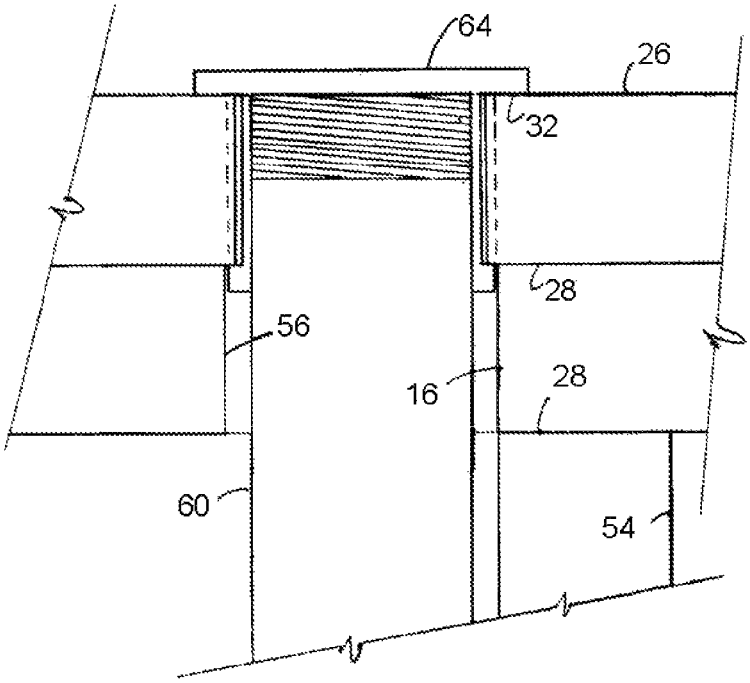
FIG. 9 is a section view of an optional top closure cover with flanges to assist in providing additional closure pressure and rigidity between the top closure cover and the headstone.

Alternately, flanges attached to the sides of the burial container, twisted in either direction against the underside of the headstone, would provide weather resistances and secure tamperproof top closure cover to the burial container, as illustrated in FIG. 9.

This connector forms the top surface and provides a secured closure and maybe accessed via a special security tool that provides for authorized access for locking and unlocking the burial container chamber. As used herein, special security tool means a tool that is not generally available to persons. Without use of the special security tool, persons are not able to open the cinerary urn.

The top closure cover connector would be a flat circular, octagonal, or other shaped lid that may be constructed such that it can be engraved with information or ornamentation, if desired.

Additionally, the top closure cover connector could be constructed in a variety of shapes, figures, or ornamental structures including domes, crosses, sun dials, statues, or other objects (not shown). These ornamental structures would be constructed of any weather resistant material and mechanically or adhesively attached to the underlying top closure cover. Since the ornamental structures are separate implements and proprietary or well known to those skilled in the art, further detailed discussion is not deemed necessary.

The cinerary urn that would be placed in the burial container that is comprised of an elongated, cylindrical canister or vase shaped canister with an interior compartment of sufficient capacity to contain the cremated remains of the deceased. The cinerary urn canister is provided in different sizes to accommodate different volumes of cremated remains from humans, pets, or animals. The cinerary urn would be a two piece container constructed of non-ferrous metal, engineered plastic, glass fiber, carbon fiber or other similar appropriate material.

The cinerary urn canister would be closed with a threaded closure cover or a permanent closure cover. In the preferred construction, the cylindrical cinerary urn canister is constructed in a predetermined diameter and a variable or fixed length based upon the required capacity. Deceased's cremated remains are deposited in the cinerary urn canister at the crematorium or funeral home and sealed by the installation of the top lid. A votive offering and/or grave goods may also be included in the urn before the installation of the top lid.

An optional installation method is to have a burial vault container with the envisioned aperture to receive the cinerary urn(s) with or without an opening in the headstone. If the flat headstone would not contain an opening, the headstone then would be required to be removable to provide access to the burial vault.

Under certain circumstances, it may be desirable to dispense with the individual cinerary urn canisters and incorporate the cremated ashes of multiple deceased human individuals directly into the burial container. This situation may involve homeless or itinerant persons, unclaimed bodies, or arise from multiple deaths due to accidents, natural disasters, or events under similar circumstances.

Figure 8:
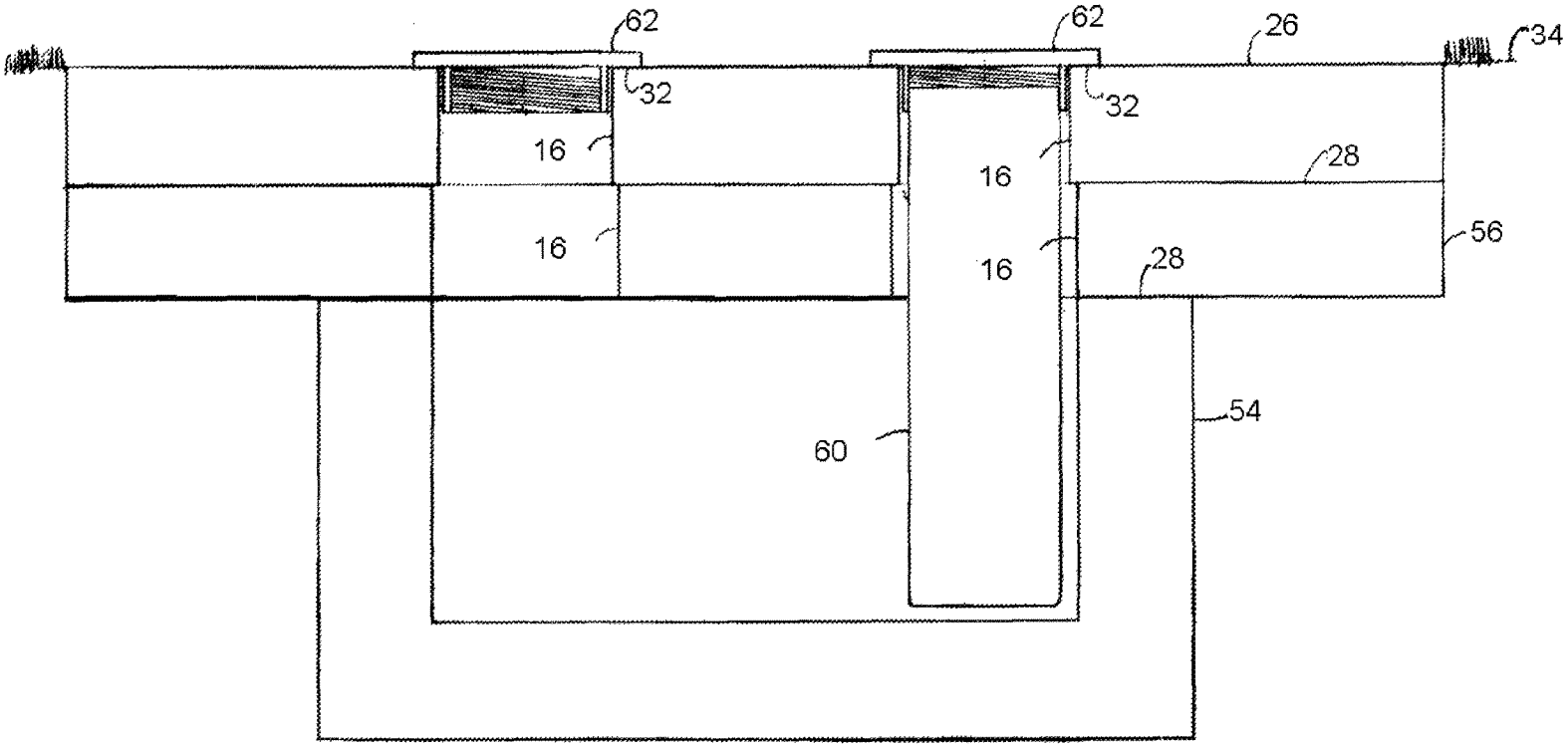
FIG. 8 is a section view of cinerary urns interred in the single concrete burial vault of sufficient size to accommodate more than one cinerary urn with integral top closure cover. The top closure cover, as an option, can also act as a standing base for display at a memorial service.

FIG. 8 illustrates a single, double, or multiple cinerary urns with a removable top closure cover 62 to facilitate the interment of cinerary urns at various times. This section drawing depicts a cinerary urn 60 housed in the burial vault 54. The top closure cover 62 is depicted as a circular disk in shape. However, the size, shape and thickness are variable, including geometric volumes and free form.

The cinerary urn 60 resides inside the aperture 16 in the headstone 26 and the burial vault 54 with vault cover 56. The headstone 26 is leveled and attached to the burial vault cover 56 such as with an industrial grade commercially available water-tight leveling compound 28.

The cinerary urn top closure cover 62 is adhesively fastened 32 to bond to the headstone 26. The top closure cover 62 would be secured to the headstone 26 to provide a weather tight and security for the top closure cover. As an option, the top closure cover 62 can be recessed into the headstone 26 with its vertical thickness to be flush with the top surface of the headstone 26.

FIG. 9 is a partial section drawing illustrating an optional top closure 64 with two extended flanges to provide additional pressure to secure the top closure cover 64 against the underside of the headstone 26 through aperture 16. The top closure cover 64 is inserted in aperture 16 in headstone 26 with 2 or more slots (4 slots shown) to accommodate the top closure cover 64 flanges and twisted in either direction to secure the top closure cover 64. The top closure cover 64 is also adhesively fastened 32 to bond to the headstone 26.

Figure 10:
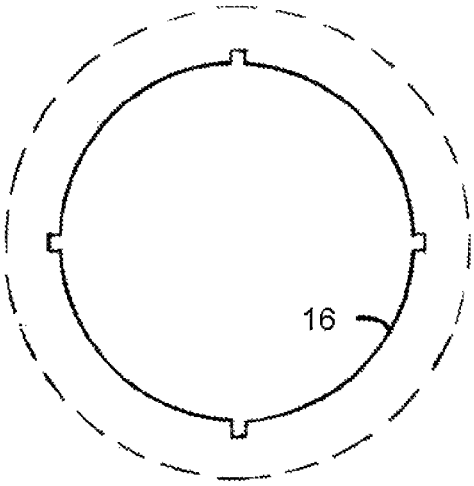
FIG. 10 is a plan view indicating four slots in the headstone to accommodate the flanges on the top closure cover.

FIG. 10 is a plan drawing depicting aperture 16 with two slots in headstone 26 to accommodate the top closure 64 with flanges. A four slot option is also envisioned in the headstone to accommodate headstone 26 with four flanges as part of the urn container 60. As an option, the top closure cover 64 can be recessed into the headstone 26 with its vertical thickness to be flush with the top surface of the headstone 26 or slightly raised above the headstone 26. This is illustrated by the dashed lines representing the exterior edges of a circular or other shaped top closure cover.

Figure 11:
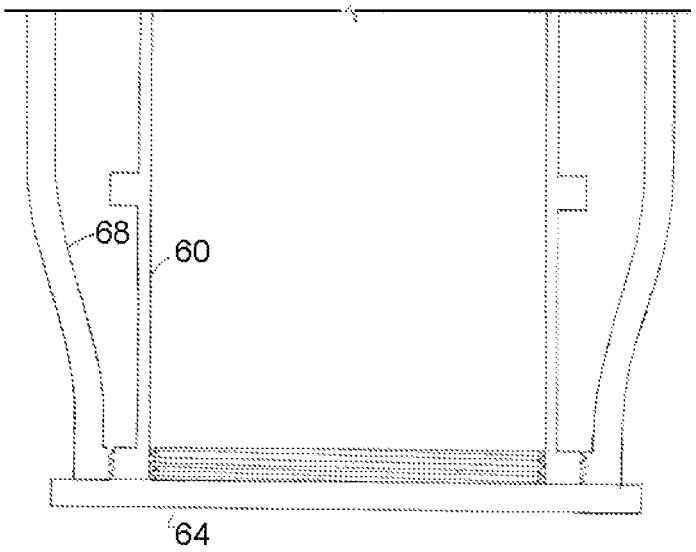
FIG. 11 is a section view of the option of inserting and screwing the urn canister with threaded flanges into a threaded ring at the open base of an urn vase.

FIG. 11 represents an option to the urn container 60 to provide two additional flanges that protrude from the sides that are threaded. This flange arrangement provides for the urn canister top cover 64 in the up side down position to become a base for the urn vase 66 to enclose the urn canister 60. The urn vase 66 has an open bottom with a threaded ring 68 adhesively fastened on the inside at the bottom of the urn vase 66 opening that mechanically attaches to the urn canister 60. This arrangement provides for a ceremonial urn vase 66 to contain the urn canister 60 during a memorial or remembrance ceremony for the deceased.

Figure 12:
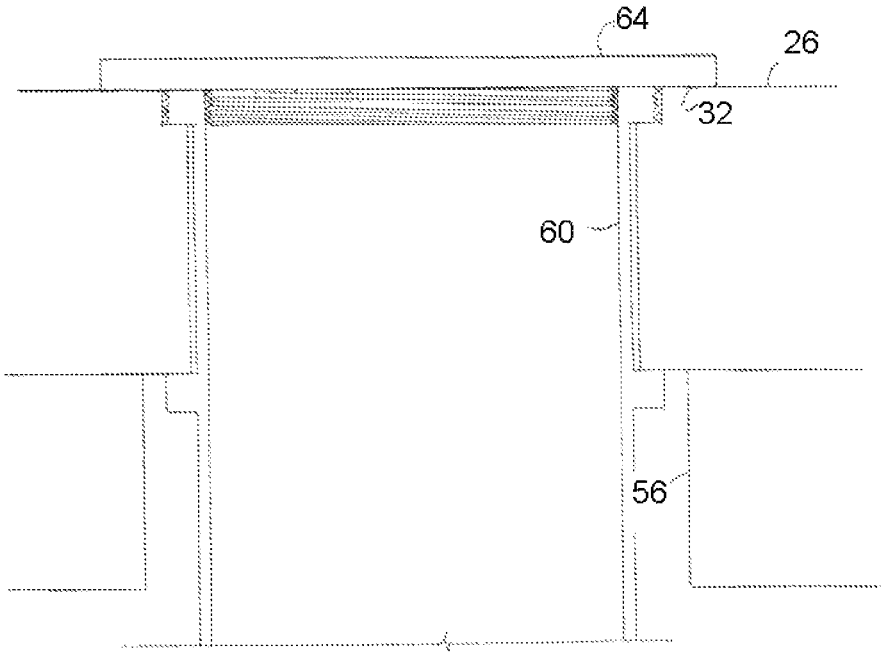
FIG. 12 is a section view of the urn canister with flanges inserted through the headstone and burial vault cover into the burial vault. The drawing illustrates the insert arrangement with the flanges tight against the underside of the headstone providing additional closure pressure and rigidity between the top closure cover and the headstone.

FIG. 12 indicates the urn canister 60 is removed from the urn vase 66, after the ceremony, and is inserted through the slotted opening in the headstone 26. The top cover 64 is installed in sealant 32 above the headstone 26 surface and twisted generally in clockwise direction *so that the second sealing mechanism 72 engages the headstone 26* providing a tight fit between the urn canister 60 flanges and the underside of the headstone 26. In this arrangement the urn canister 60 is interred below the headstone 26 through the opening in the vault cover 56 and into the burial vault 54.

A receptacle or attachment mechanism may be provided on the headstone 26 and/or the top lid 12 to facilitate attaching a memorial enhancing object thereto. In certain embodiments, the memorial enhancing object is a figurine or a vase that is adapted to receive flowers. The receptacle or attachment mechanism may be manually operable to facilitate a person attaching or detaching the memorial enhancing object without the use of tools.

At least one of the components of the burial system may include a genetic material receptacle, which is used to preserve at least one aspect of genetic material from the person whose remains are placed therein.

In certain embodiments, the genetic material receptacle may have a recess formed therein that is sealed after the genetic material is placed therein. The genetic material receptacle may be attached to or integrated with at least one of the urn, the urn receptacle and the headstone.

It is the intention of this invention to provide a simple effective burial system for human, pet, or animal cremation remains that respects the traditional practice of complete underground burial of the deceased. This burial system however could also be installed above grade if desired, or required due to geological or hydrological conditions.

It is possible, as an option, to install the burial container and headstone without a foundation pad or burial vault and in this type of installation the headstone would also function as a support plate and the foundation.

Although not specifically illustrated in the drawings, it should be understood that additional equipment and/or structural components may be provided as necessary or desired (due to geology, topography, soil conditions, etc.), and that all of the components described are organized and supported in an appropriate manner to form a complete and operative system. Additional cemetery rules or regulations may require additional ancillary accessories or construction for burial in a particular cemetery.

It is also understood that variations may be made in the present invention without departing from the scope of this invention. For example, the system may employ urns, vases, or canisters of different size, shapes, capacities and/or configurations (not shown) for the interment of cremated remains in lieu of the canisters, urns, vases utilized or illustrated. This is especially true for pet or animal remains. It is contemplated that any one of variety of such modifications and interchangeable canisters may be used in conjunction with this system.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A cremated remains remembrance and burial system comprising:

an urn having an urn recess adapted to receive a cremated remains, wherein the urn having an opening [with], *wherein the urn having* a first sealing mechanism *on an inner surface thereof* and *wherein the urn having a* second sealing mechanism *on an outer surface thereof*;

an urn lid that is capable of engaging the first sealing mechanism to substantially seal the opening;

an urn enclosure having an enclosure recess formed therein that is adapted to receive the urn, wherein the urn enclosure is adapted to engage the second sealing mechanism to retain the urn in engagement with the urn enclosure; and a headstone having an opening formed therein that is adapted to receive at least a portion of the urn, wherein the headstone is adapted to engage the second sealing mechanism to retain the urn in engagement with the headstone.

2. The cremated remains remembrance and burial system of claim 1, wherein the urn and the urn lid are fabricated from a material that resists corrosion, degradation and is substantially gas impermeable.

3. The cremated remains remembrance and burial system of claim 1, wherein when the urn lid is attached to the urn, a waterproof seal is formed.

4. The cremated remains remembrance and burial system of claim 1, and further comprising a locking system that prevents the urn lid from being separated from the urn, wherein the locking mechanism comprises at least one of an adhesive and a mechanical fastener.

5. The cremated remains remembrance and burial system of claim 1, and further comprising a locking mechanism that prevents the urn from being separated from the headstone, wherein the locking mechanism comprises at least one of an adhesive and a mechanical fastener.

6. The cremated remains remembrance and burial system of claim 1, and further comprising a headstone lid.

7. The cremated remains remembrance and burial system of claim 1, wherein the urn enclosure substantially covers the urn when the urn is in engagement with the urn enclosure and wherein an aesthetically pleasing surface is placed on at least a portion of the urn enclosure.

8. The cremated remains remembrance and burial system of claim 1, wherein the first [engagement] *sealing* mechanism is formed on an outer surface of the urn and the second [engagement] *sealing* mechanism is formed on an inner surface of the urn.

9. The cremated remains remembrance and burial system of claim 1, wherein the first sealing mechanism is independently operable from the second sealing mechanism.

10. The cremated remains remembrance and burial system of claim 1, wherein the first [engagement] *sealing* mechanism is a first thread and wherein the urn lid comprises a second thread having a shape that is complementary to the first thread so that when the second thread engages the first thread, the urn lid is retained in engagement with the urn.

11. A cremated remains remembrance and burial method comprising:

placing cremated remains in an urn having an urn recess comprising an opening [with], *wherein the urn having* a first sealing mechanism and a second sealing mechanism *at an open end of the urn*;

attaching an urn lid to the urn, wherein the urn lid engages the first sealing mechanism to substantially seal the opening;

placing the urn in an urn enclosure, wherein the urn enclosure has an enclosure recess formed therein that is adapted to receive the urn;

retaining the urn in engagement with the urn enclosure by engaging the urn enclosure with the second sealing mechanism;

conducting a memorial service where persons view the urn enclosure;

separating the urn from the urn enclosure after the memorial service is completed;

placing the urn in an opening formed in a headstone, wherein the opening is adapted to receive at least a portion of the urn; and retaining the urn in engagement with the headstone by engaging the headstone with the second sealing mechanism.

12. The cremated remains remembrance and burial method of claim 11, wherein attaching the urn lid to the urn forms a waterproof seal.

13. The cremated remains remembrance and burial method of claim 11, and further comprising locking the urn lid to the urn, wherein the locking utilizes at least one of an adhesive and a mechanical fastener.

14. The cremated remains remembrance and burial method of claim 11, and further comprising locking the urn to the headstone, wherein the locking utilizes at least one of an adhesive and a mechanical fastener.

15. The cremated remains remembrance and burial method of claim 11, and further comprising placing an aesthetically pleasing surface on at least a portion of the urn enclosure [and wherein the urn enclosure has a greater intrinsic value than the urn].

16. The cremated remains remembrance and burial method of claim 11, wherein the first [engagement] *sealing* mechanism is formed on an outer surface of the urn and the second [engagement] *sealing* mechanism is formed on an inner surface of the urn and wherein the first sealing mechanism is independently operable from the second sealing mechanism.

17. The cremated remains remembrance and burial method of claim 11, wherein the first [engagement] *sealing* mechanism is a first thread and wherein the urn lid comprises a second thread having a shape that is complementary to the first thread so that when the second thread engages the first thread, the urn lid is retained in engagement with the urn.

*18. A method of memorializing a deceased living being comprising:*

*placing cremated remains in an urn;*

*sealing the cremated remains in the urn;*

*providing a ceremonial urn enclosure having an opening formed therein;*

*placing the urn into the ceremonial urn enclosure opening;*

*conducting a memorial or remembrance ceremony where persons view the ceremonial urn enclosure;*

*separating the urn from the ceremonial urn enclosure after the memorial or remembrance ceremony is completed; and*

*placing the urn in an interment location.*

*19. The method of claim 18, wherein the ceremonial urn enclosure substantially encloses the urn.*

*20. The method of claim 18, and further comprising mechanically engaging the urn and the ceremonial urn enclosure.*

*21. The method of claim 20, wherein urn comprises a flange extending therefrom and wherein the flange is used for mechanically engaging the urn and the ceremonial urn enclosure.*

*22. The method of claim 20, wherein the urn comprises a threaded surface that mechanically engages a threaded ring on the ceremonial urn enclosure.*

*23. The method of claim 18, providing a headstone at the interment location, wherein the headstone has an opening formed therein and further comprising placing the urn in the headstone opening.*

*24. The method of claim 18, and further comprising placing the urn in a columbarium storage system at the interment location.*

* * * * *